United States Patent [19]

Narue et al.

[11] Patent Number: 4,702,722
[45] Date of Patent: Oct. 27, 1987

[54] UNIVERSAL JOINT YOKE

[75] Inventors: Atsushi Narue; Shigeru Saitoh; Tomoyuki Maruyama, all of Kosai, Japan

[73] Assignee: Fuji Kiko Company, Limited, Tokyo, Japan

[21] Appl. No.: 830,274

[22] Filed: Feb. 18, 1986

[30] Foreign Application Priority Data

Feb. 25, 1985 [JP] Japan .................................. 60-34517
Feb. 25, 1985 [JP] Japan .................................. 60-34518
Jul. 22, 1985 [JP] Japan ........................... 60-111040[U]

[51] Int. Cl.$^4$ .............................................. F16D 3/26
[52] U.S. Cl. ...................................... 464/93; 464/134
[58] Field of Search ............... 29/150; 72/379; 403/57, 403/58, 74; 464/71, 92, 93, 134, 135, 160, 180; 74/492

[56] References Cited

U.S. PATENT DOCUMENTS

| 2,067,283 | 1/1937 | Padgett | 464/134 |
| 2,264,727 | 12/1941 | Stillwagon, Jr. | 464/134 |
| 3,045,455 | 7/1962 | Potgieter | 464/134 |
| 3,901,048 | 8/1975 | Pitner | 464/134 |
| 4,365,488 | 12/1982 | Mochida et al. | 464/134 X |
| 4,460,290 | 7/1984 | Mallet | 464/134 X |

FOREIGN PATENT DOCUMENTS 1214244 12/1970 United Kingdom ................. 464/134
2040395 8/1980 United Kingdom ................. 464/134

Primary Examiner—Daniel P. Stodola
Attorney, Agent, or Firm—Bachman & LaPointe

[57] ABSTRACT

A universal joint yoké is obtained from a flat blank of sheet metal whose general shape is that of a cruciate form having a circular base and two diametrically opposing small semielliptical extensions. The blank of sheet metal is pressed in a forming apparatus so that the two extensions are bent perpendicularly to the circular base in the same direction with a given angle with respect to the circular base and two ribs or contiguous rib are formed along axes of bending to prevent a springback action of the two extensions which constitute two ear portions of the finished yoke. In addition, recesses are extended along a rear surface(s) of the rib(s) so that fasteners such as bolts and nuts for fastening a rubber coupling constituting a lower joint to a lower shaft of a steering system is nestled into the respective recesses. Both ends of the circular base have holes through which the fasteners for fastening the universal joint yoke to the rubber coupling is inserted. Distal ends of the two ear portions have also coaxial holes through which two trunnions of a universal joint cross member is journalled.

11 Claims, 22 Drawing Figures

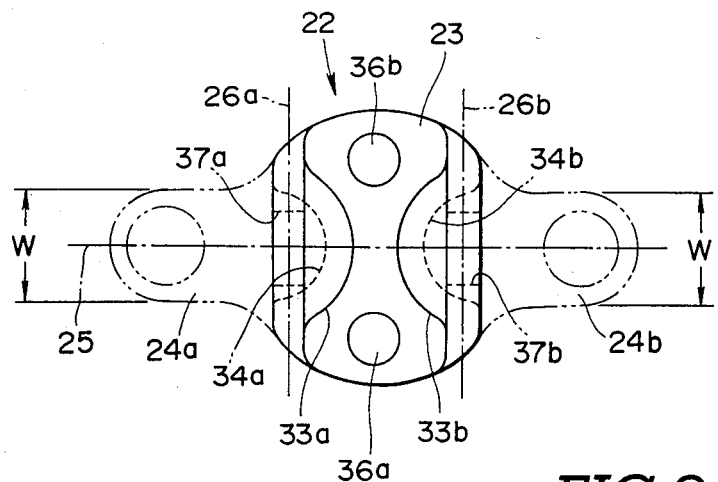
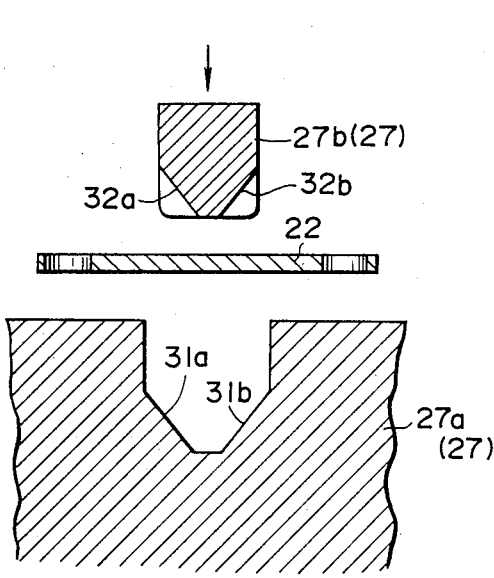
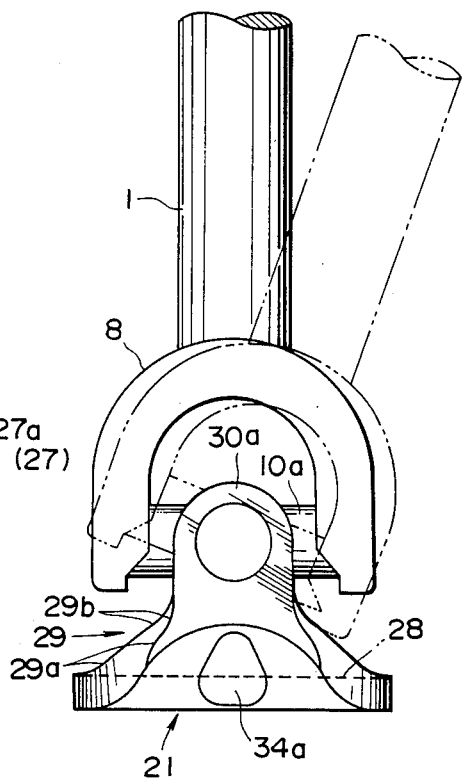

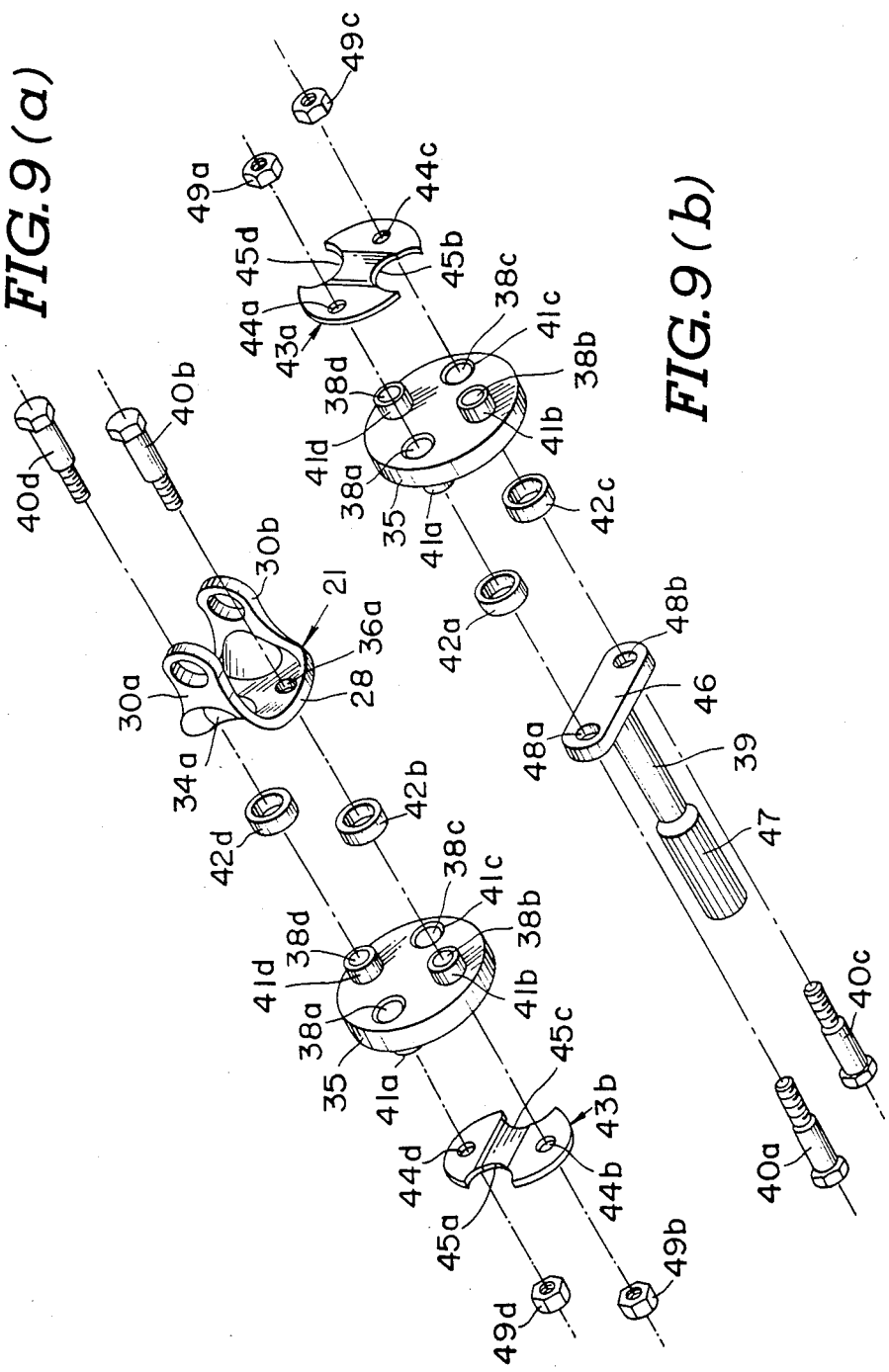

UNIVERSAL JOINT YOKE

BACKGROUND OF THE INVENTION

1. Field of the Invention

The present invention relates generally to a universal joint yoke having a higher stiffness and greater joint angle and which is produced by folding a sheet metal blank. The present invention relates more specifically to the above-described universal joint yoke for a steering system including two ear portions which are provided with bores for mounting bearings of two trunnions of a cross member and which are interconnected to a base portion provided with other bores through which means for securing the yoke to shock absorbing means, e.g., a rubber coupling is inserted.

2. Description of the Prior Art

Such a kind of universal joint yoke has been used as one of components constituting a steering column of a steering system applied to automotive vehicles.

FIGS. 1 and 2 show a conventional universal joint yoke.

As shown in FIGS. 1 and 2, a lower joint 3 joints a steering column 1 to a steering gear unit 2. Two yokes 5, 6 are attached respectively to upper and lower ends of a lower shaft 4 and two yokes 8, 9 are respectively attached to one end of the steering column 1 and to one end of a gear shaft 7. The respective ends of yokes 8, 9 adjoin the opposing yokes 5, 6. Each pair of yokes 5, 8 and 6, 9 is universally jointed together by means of respective trunnions 10a, 10b.

The lower joint 3 has a shock absorbing construction in order to damp vibrations and noises caused by an engine mounted on the vehicle, uneven road surfaces, etc., and transmitted from the steering system located below the lower joint 3 to a steering wheel via a steering shaft 1.

An essentially disc-shaped rubber coupling 11 is attached to the base portion of the yoke 5 as shock absorbing means by means of bolts and nuts 12, 13 and to the lower shaft 4 (to be described later). Therefore, most of the above-described vibrations and noises transmitted to the lower joint 3 are damped by means of the rubber coupling 11, so that such vibrations and noises cannot be transmitted to the steering wheel and vehicle compartment.

Japanese Utility Model Application Unexamined Open No. Sho. 57-172,930 (corresponding to U.S. Pat. No. 3,901,048 issued on Aug. 26, 1975) exemplifies the universal joint yoke in which the yoke is fixed to the lower joint 3.

In details, as shown in FIGS. 3 and 4, the yoke 5 is made of an essentially diamond-shaped metal plate with both ends of a longer diagonal folded upward to form the shape of a letter "C" in section. The yoke 5 comprises: (a) the base portion 15 having holes 14a, 14b for attaching the whole yoke 5 to the rubber coupling 11 and (b) the two ear portions 17a, 17b having two opposing holes 16a, 16b for mounting bearings of two trunnions 10a of the cross member. It is noted that the two opposing holes serve to journal the trunnion 10a.

The yoke 5 formed as described above is fixed to the upper end of the lower shaft 4 via the rubber coupling 11, as shown in FIG. 2. In this case, the rubber coupling 11 is fixed to both extended ends of mounting flangs 18a, 18b of a yoke 18 which is attached around an intermediate periphery of the lower shaft 4, the mounting flanges thereof being extended outwardly at a given angle with respect to an axial direction of the lower shaft 4. The yoke 5 is fastened to the rubber coupling 11 in such a way that a lower surface of the base portion 5 rests on an upper surface of the rubber coupling 11. Bolts 19 are inserted through the holes 14a, 14b shown in FIG. 3 and fastened to the rubber coupling 11 together with corresponding nuts as shown in FIG. 2.

It is noted that two bolts 12 are aligned on the larger diagonal of the yoke, i.e., diamond-shaped sheet metal and that the nuts 13 engaged on threaded portions of both bolts 12 are placed outside of the ear portions 17a, 17b which face each other. It is also noted that a line connecting both bolts 19 is orthogonal to the line connecting both bolts 12. The yoke 5 thus fixed to the lower shaft 4 via the rubber coupling 11 is then universally jointed to the opposing yoke 8 fixed to the steering shaft 1 via the trunnion 10a.

However, there are several drawbacks to the above-described conventional universal joint yoke.

Specifically, since the conventional yoke 5 is formed merely by folding the essentially diamond-shaped metal plate along parallel fold lines to define the base 15 and two ear portions 17a, 17b, the stiffness in the region of fold lines of the two ear portions 17a, 17b is so low that, when the yoke 5 is incorporated in the universal joint of the steering column and a high steering torque is subjected to the yoke 5, the ear portions 17a, 17b tend to deform outwardly.

In addition, since the rubber coupling 11 is fixed to the mounting flanges 18a, 18b by means of the bolts 12 and nuts 13, ends of the nuts 13 must be located outside the outer surfaces of the respective ear portions 17a, 17b so that the bolts 12 and nuts 13 do not come into contact with the ear portions during the movement of universal joint with the steering wheel. Therefore, the outer dimension of the rubber coupling 11 must inevitably be increased in order to avoid the ends of nuts 13 and bolts 12 from coming into contact with the ear portions 17a, 17b and to render the rubber coupling 11 have a strength enough to withstand the torsional torque applied through the bolts 13 without increase in thickness of the yoke since the dimensions of the yoke are usually determined according to respective vehicle models.

Consequently, a rotation radius of the rubber coupling 11 is accordingly increased.

In this case, a joint rotation radius is similarly increased and outer appearance of the universal joint is unsightly.

Furthermore, since moderately inclined surfaces 20a, 20b are formed on both side edges of each ear portion 17a, 17b as shown in FIG. 4, a working angle of the universal joint (the joint angle of the yoke 5 with respect to the opposite yoke 8) is consequently restricted. Therefore, a spatial utility of the steering shaft 1 as well as the whole steering system is accordingly reduced.

SUMMARY OF THE INVENTION

With the above-described drawbacks in mind, it is an object of the present invention to provide a universal joint yoke which has higher stiffness and less deformation of the yoke under a torsional torque applied during the operation of the joint.

It is another object of the present invention to provide a universal joint yoke in which a small rotation radius of the universal joint is achieved.

It is still another object of the present invention to provide a universal joint yoke which can reduce the diameter of the rubber coupling when the yoke is attached to the rubber coupling.

It is further another object of the universal joint yoke which can increase a working angle of the universal joint.

This can be achieved by providing a universal joint yoke, comprising: (a) a bent sheet metal blank, the blank before being bent having a generally cruciate form which has two semielliptical portions and a central circular portion, the bent sheet metal blank including; (b) a pair of ear portions which are respectively constituted by the semielliptical portions and have two bores for mounting two trunnions of a universal joint cross member, (c) a base portion defined by the central circular portion of the sheet metal blank and interconnecting the pair of ear portions, and (d) at least two inwardly projecting rib portions formed along each major axis of the semielliptical portions so as to extend over one of the pair of ear portions and the other of the pair of ear portions.

This can also be achieved by providing a universal joint yoke, comprising: (a) a bent sheet metal blank, the blank before being bent having a generally cruciate form which has two semielliptical portions and a central circular portion, the bent sheet metal blank including; (b) a pair of ear portions which are respectively constituted by the semielliptical portions and have two bores for mounting two trunnions of a universal joint cross member, (c) a base portion defined by the central circular portion of the sheet metal blank and interconnecting the pair of ear portions, and (d) a recess formed along each major axis of the elliptical portions so as to extend over one of the pair of ear portions and the other of the pair of ear portions.

BRIEF DESCRIPTION OF THE DRAWINGS

A more complete understanding of the present invention may be obtained from the following detailed description take in conjunction with the attached drawings in which:

FIG. 6 is a plan view of the universal joint yoke shown in FIG. 5;

FIG. 7 is a diagrammatic cross sectional view of a yoke forming apparatus for explaining a principle of forming the universal joint yoke;

FIG. 8 is a diagrammatic side view of the assembled universal joint yoke shown in FIGS. 5 and 6;

FIGS. 9(a) and 9(b) are an integrally exploded perspective view of a lower joint including the universal joint yoke shown in FIGS. 5, 6, and 8;

DETAILED DESCRIPTION OF THE PREFERRED EMBODIMENTS

Reference will hereinafter be made to the drawings in order to facilitate understanding of the present invention.

FIG. 5 through 8 show a first preferred embodiment of a universal joint yoke according to the present invention.

Figure 5:
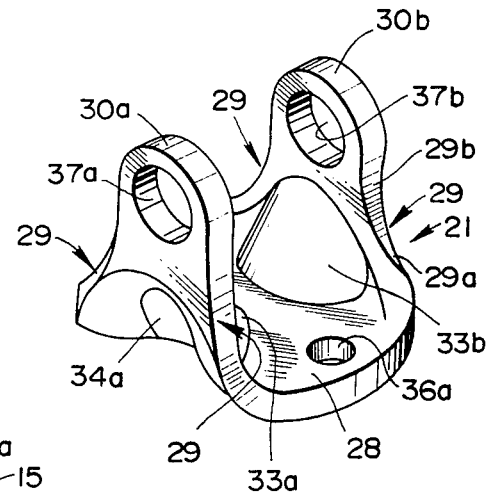
FIG. 5 is a perspective view of a universal joint yoke of a first preferred embodiment according to the present invention.

A preliminarily shaped sheet metal of a predetermined profile is pressed to form a yoke 21 having a cross section substantially of a letter "C" shape shown in FIG. 5.

In this embodiment, the sheet metal 22 shown in FIG. 6 comprises: a circular base portion 23; and two small semielliptical extensions 24a, 24b of substantially equal width W to each other and with central rib portions inwardly projecting from their bottom ends toward a center of the circular base 23.

It should be noted that the predetermined profile of the preliminarily shaped sheet metal 22 refers to a substantially cruciate form as denoted by a phantom line and a solid line continued to the phantom line in FIG. 6.

In more details, the preliminarily shaped sheet metal before pressing has such a profile that small semielliptical extensions are interconnected to a central portion having circular peripheries at ends of the shorter axis of each semielliptical extension.

The above-described metal sheet 22 is formed by a press using, e.g., a yoke forming apparatus 27 comprising a lower die 27a and upper punch 27b as shown in FIG. 7. The metal sheet 22 is bent to form two ear portions derived from the two small semielliptical extensions 24a, 24b along preselected lines 26a, 26b until they stand substantially perpendicular to the base portion 23 and in parallel to each other.

The yoke 21 thus finished, as shown in FIG. 5, comprises the circular base portion 28 truncated along diametrically opposing secants 26a, 26b denoted by a dot-and-dash line in FIG. 6 and the two ear portions 30a, 30b which extend substantially upwardly from the base portion 28 with their peripheral edges being formed with curvatures 29. It should be noted that the curvatures 29 comprise convex portions 29a adjacent to the base portion 28 and concave portions 29b adjacent to the convex portions 29a. The concave portions 29b smoothly join distal ends of the two ear portions 30a, 30b, as shown in FIGS. 5 and 8.

In addition, in this embodiment, projections 31a, 31b and matching recesses 32a, 32b are provided respectively on either side of the lower die 27a and on the corresponding sides of the upper punch 27b in the forming apparatus shown in FIG. 7. It should be noted that, as shown in FIGS. 5 and 8, the metal sheet 22 is embossed to form recesses 34a, 34b directing toward the center of the base portion 23 and thereby inwardly projecting ribs are correspondingly formed above the respective recesses. More precisely, the ribs 33a, 33b are formed at respective central portions bridging each of two ear portions 30a, 30b and the base portion in order to prevent a springback action after press forming of the two ear portions 30a, 30b and to increase the stiffness of the ear portions. Therefore, exposed threaded portions of bolts and nuts for fastening a rubber coupling 35 to a mounting flange to be described later are nestled into these recesses 34a, 34b of the universal joint yoke 21. Furthermore, two holes 36a, 36b for attaching the yoke 21 to the rubber coupling 35 are bored through a flat surface of the base portion 28 and two holes 37a, 37b are bored through the upper ends of the two ear portions 30a, 30b, respectively.

Figure 10:
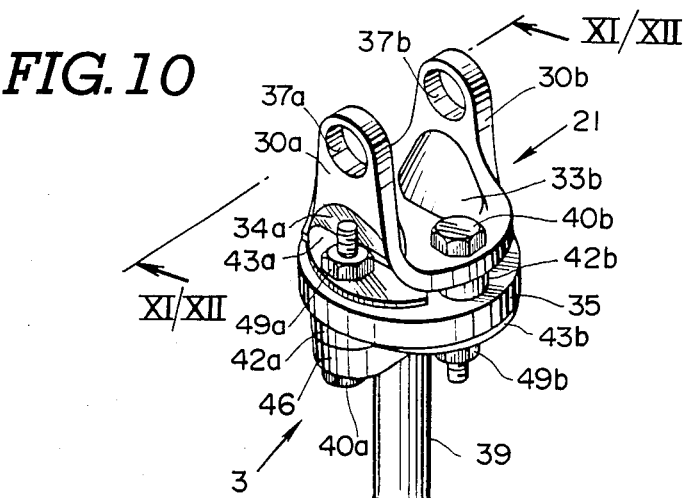
FIG. 10 is an overall drawing of the lower joint including the universal joint yoke in an assembled state.
Figure 11:
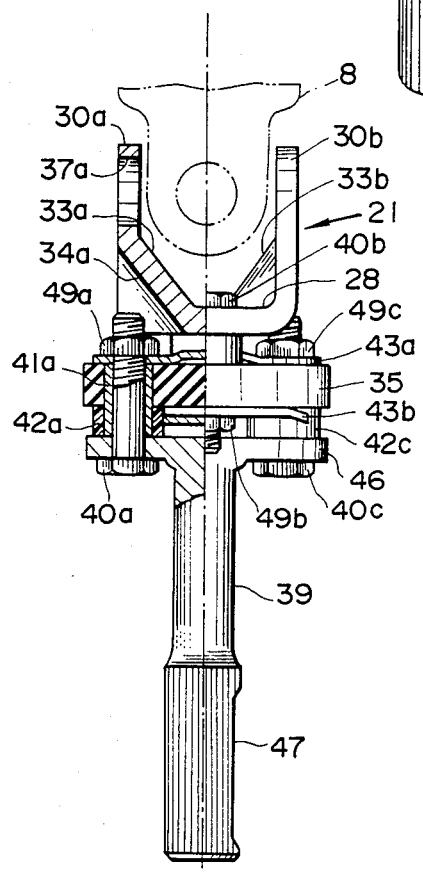
FIG. 11 is a partly sectioned view of the lower joint in the assembled state which is cut away along the line XI—XI in FIG. 10.

The yoke 21 shown in FIG. 5 will be described with reference to FIGS. 9 through 11 which is used in the universal joint between the steering column 1 and lower joint 3.

The rubber coupling 35 in the first embodiment has a shape of a disc having substantially the same diameter as a maximum diameter of the base portion 28 of the yoke 21. In addition, the rubber coupling 35 has an internal fabric reinforcement structure and has four holes 38a, 38b, 38c, and 38d disposed radially symmetrically about a center of the disc. One pair of diametrically opposed holes 38a, 38c are provided internally with metal bushes 41a, 41c projecting toward a lower shaft 39 for accommodating bolts 40a, 40c and, on the other hand, another pair of holes 38b, 38d are also provided internally with metal bushes 41b, 41d projecting toward the yoke 21 for accommodating bolts 40b, 40d.

In addition, plastic collars 42a, 42c, 42b, and 42d are externally mounted around projected peripheries of the respective bushes 41a, 41c, 41b, and 41d and two H-shaped stopper plates 43a, 43b are fastened to both upper and lower surfaces of the rubber coupling 5 by means of bolts and nuts 40a, 49a, 40c, 49c, 40b, 40d, 49d, and 49b, respectively, at positions substantially offset 90 degrees with respect to each other.

Each sidewall of cut-out recesses of the stopper plates 43a, 43b will be contacted with adjacently located plastic collars 41a, 41c, 41b, and 41d when the universal joint is subjected to a large torque from the steering column. Thereby, the rubber coupling 35 is protected against an excessive twisting and damage due to the large torque.

The mounting flange 46 is formed integrally at one end of the lower shaft 39 and a serration 47 is formed at the other end of the lower shaft 39. When the yoke 21 is incorporated into the lower joint 3 together with the rubber coupling 35, the bolts 40a, 40c are inserted through the above-described holes 48a, 48b at the left- and right-hand ends of the mounting flange 46 of the lower shaft 39, as shown in FIG. 9(a).

At this time, the bolts 40a, 40c are passed through the holes 38a, 38c of the rubber coupling 35, and corresponding holes 44a, 44c of the one stopper plate 43b disposed on the upper surface of the rubber coupling 35 via the plastic collars 42a, 42c. The nuts 49a, 49c are, in turn, turned inwardly around corresponding threaded parts of the bolts 40a, 40c so as to fasten the rubber coupling 35 to the mounting flange 46. In this way, the rubber coupling 35 can appropriately be mounted on the mounting flange 46 of the lower shaft 39.

Next, the yoke 21 is mounted on the upper surface of the rubber coupling 35 in the following way. With the two recesses 34a, 34b of the yoke 21 overlying heads of the corresponding bolts 40a, 40c fastening the rubber coupling 35 to the mounting flange 46, the bolts 40b, 40d for fastening the yoke 21 to the rubber coupling 35 are passed through the corresponding holes 36a, 36b from above the upper flat surface of the base portion 28. The bolts 40b, 40d are then passed through the holes 38b, 38d of the rubber coupling 35 and holes 44a, 44b of the other stopper plate 43b resting on the lower surface of the rubber coupling 35 via the respective plastic collars 42b, 42d. The nuts 49b, 49d are then turned inwardly around free threaded ends of the bolts 40a, 40c projected from the stopper plate 43b until the yoke 21 is tightly mounted on the upper surface of the rubber coupling 35 as shown in FIGS. 10 and 11.

Figure 12:
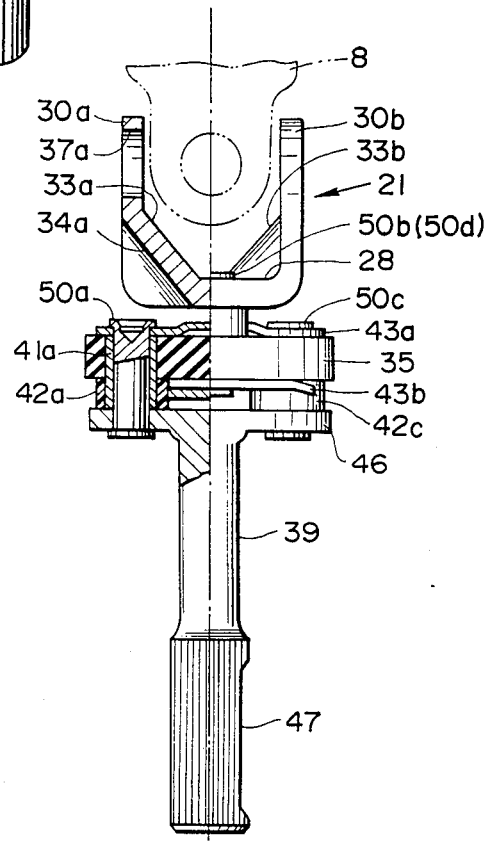
FIG. 12 is a partly sectioned view of the lower joint in the assembled state cut away along the line XII—XII in FIG. 10 showing fastening means using rivet pin arrangements differing from those show in FIG. 11.

It should be noted that as shown in FIG. 12, fastening means comprising rivet pins 50a, 50b, 50c, and 50d may alternatively be used in place of fastening means comprising the bolt-and-nut arrangement in order to mount the yoke 21 on the rubber coupling 35 and to mount the rubber coupling 35 on the lower shaft 39.

Since in the lower joint 3 with the yoke 21, the circular periphery of the base portion 28 of the yoke 21 is aligned with the circular periphery of the rubber coupling 35 and the outer diameter of the base portion 28 can substantially be the same as that of the rubber coupling 35, no part of the periphery of the base portion 28 is projected out of the circumference of the rubber coupling 35.

Figure 1:
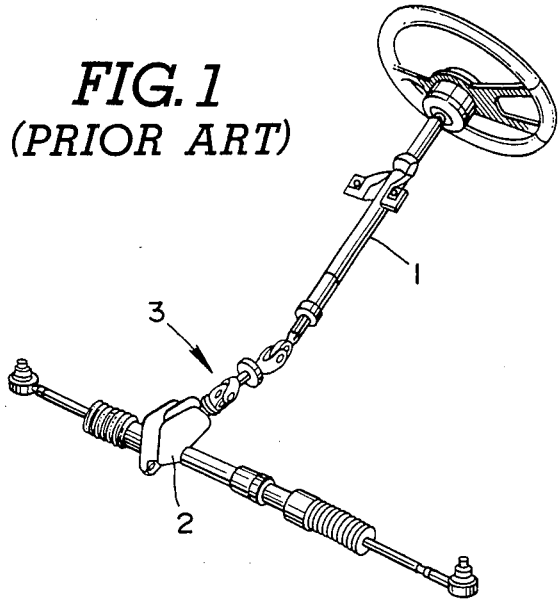
FIG. 1 is a schematic perspective view of a steering system.
Figure 2:
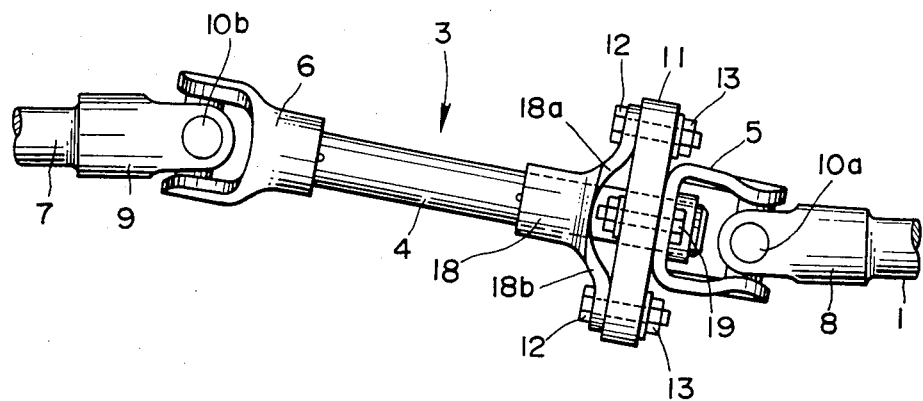
FIG. 2 is a schematic drawing of a conventional lower joint assembly disclosed in Japanese Utility Model Application Unexamined Open No. Sho. 57-172,930 (U.S. Pat. No. 3,901,048)
Figure 3:
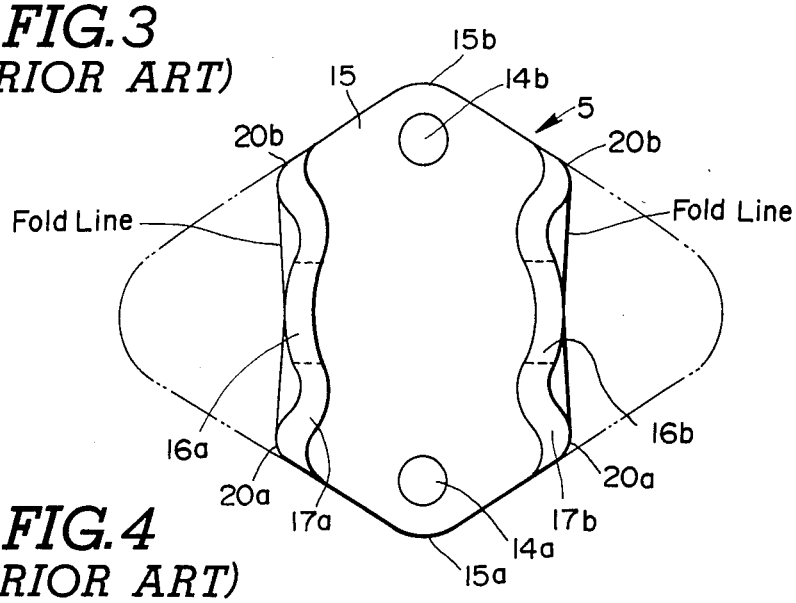
FIG. 3 is a plan view of a conventional universal joint yoke shown in FIG. 2.
Figure 4:
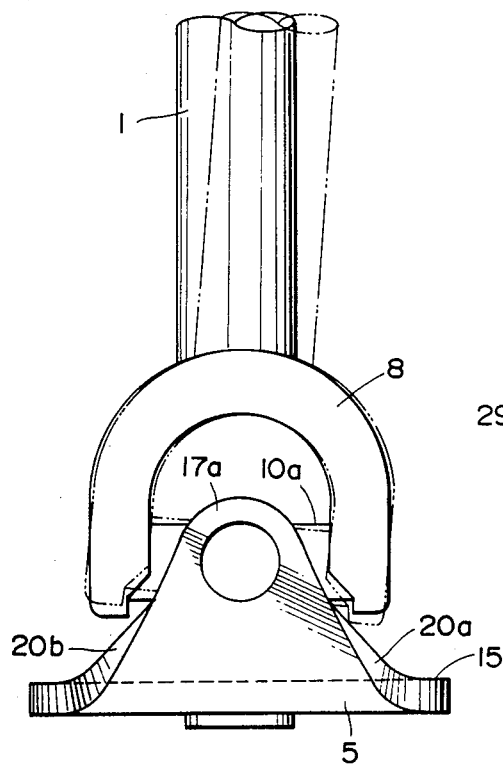
FIG. 4 is a diagrammatic view of the universal joint yoke for explaining a principle of a working angle thereof.

In addition, since in this embodiment the yoke 21 is formed by pressing the sheet metal 22 of the substantially cruciate form shown in FIG. 6 in such a way that the sheet metal 22 is folded along the diametrically opposed secants 26a, 26b of the circle constituting the base portion 23 to form the two car portions 30a, 30b and is at the same time embossed to form a reinforcing rib bridging each of the two ear portions and the base portion as shown in FIG. 6, a larger joint angle with respect to the opposite yoke 8 and a higher stiffness of the ear portions are obtained as compared with the conventional universal joint yoke shown in FIGS. 2 through 4.

Therefore, as shown in FIG. 8, the opposite yoke 8 is free to swing through a larger joint angle with respect to the trunnions 10a as compared with the conventional universal joint yoke.

Furthermore, since in this embodiment the ends of bolts 40a, 40c and nuts 49a, 49c are nestled in the recesses 34a, 34b of the yoke 21, the bolts 40a, 40c can lie within a circular outline of the base portion 28 of the yoke 21. Consequently, the base portion 28 can have substantially the same dimensions as those of the rubber coupling 35 so that the rubber coupling 35 having a minimum diameter can be achieved. As a result, a rubber coupling joint with compact design, higher spatial effectiveness around the steering system, and lighter weight can be obtained.

Figure 13:
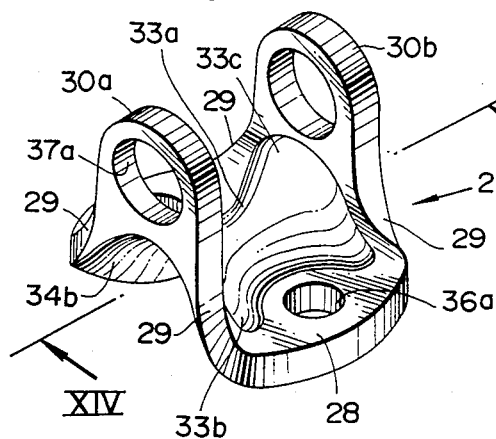
FIG. 13 is a perspective view of the universal joint yoke of a second preferred embodiment according to the present invention.
Figure 14:
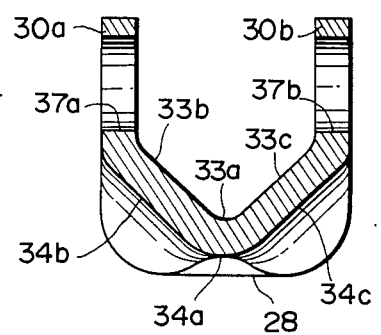
FIG. 14 is a sectional view of the universal joint yoke taken along the line XIV—XIV in FIG. 13.
Figure 15:
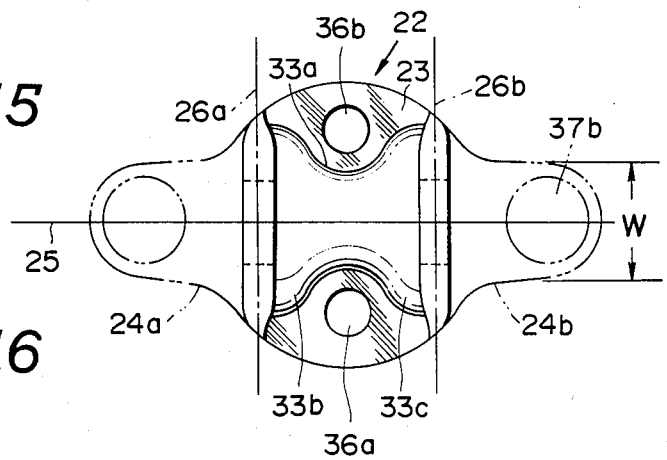
FIG. 15 is a plan view of the universal joint yoke forming apparatus.

FIGS. 13 through 15 show a second preferred embodiment of the universal joint yoke according to the present invention. The yoke 21 is shaped substantially in the letter "C" form in cross section by pressing in the same way as described in the first preferred embodiment. The sheet metal 22 comprises two ear portions 24a, 24b and base portion 3 as in the first preferred embodiment.

Description of constituents of the yoke 21 identical to those in the first preferred embodiment will be omitted here; identical reference numerals designate corresponding elements. Therefore, only the differences between the first and second preferred embodiments will be described below.

Figure 16:
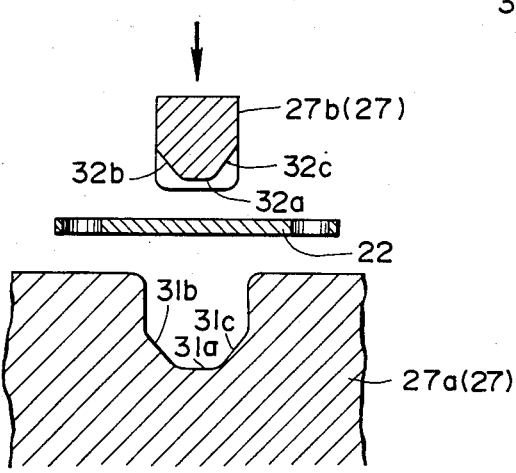
FIG. 16 is a cross-sectional view through an example of the yoke forming apparatus.
Figure 17:
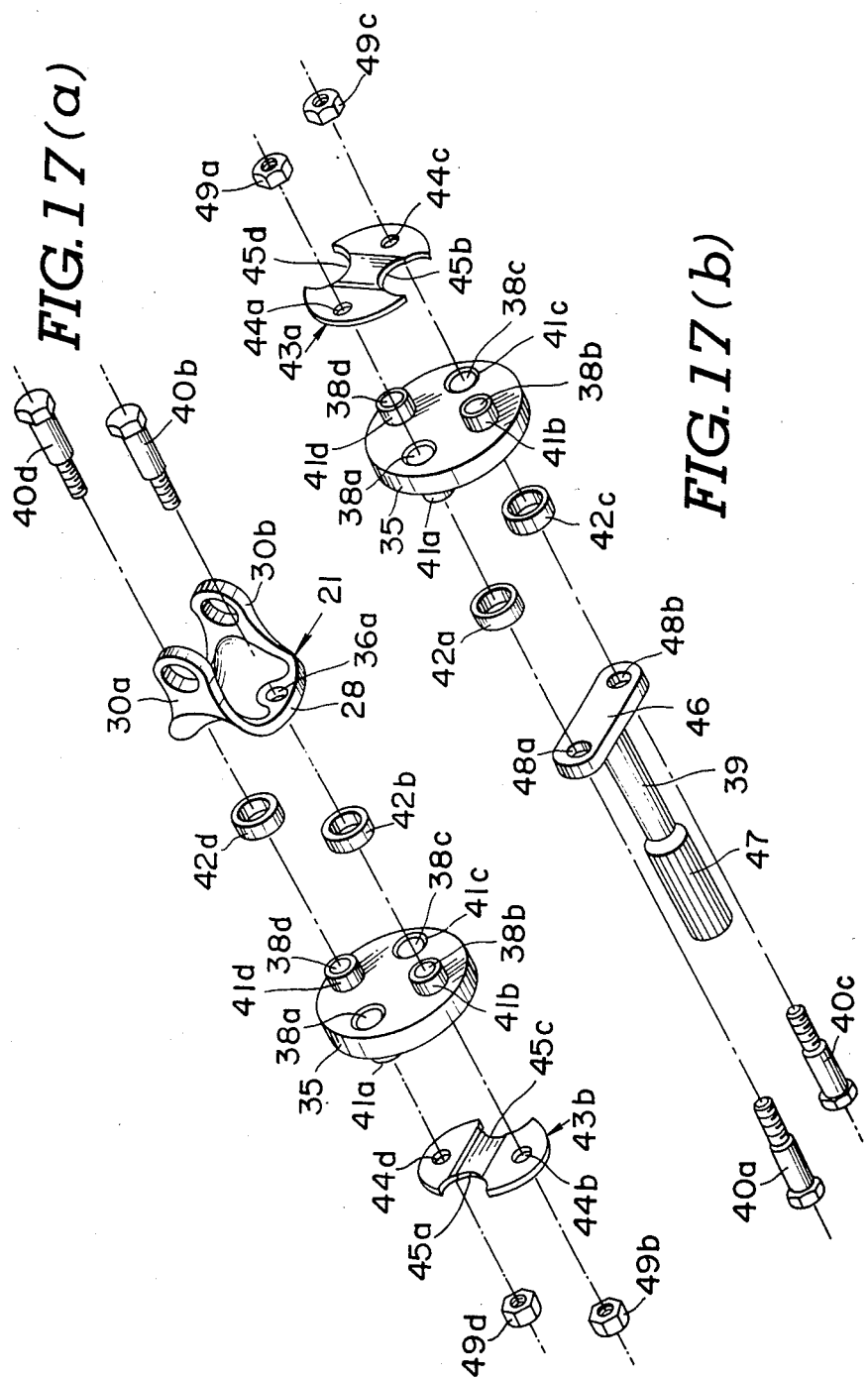
FIGS. 17(a) and 17(b) are an integrally exploded perspective view of the lower joint in the second preferred embodiment.
Figure 18:
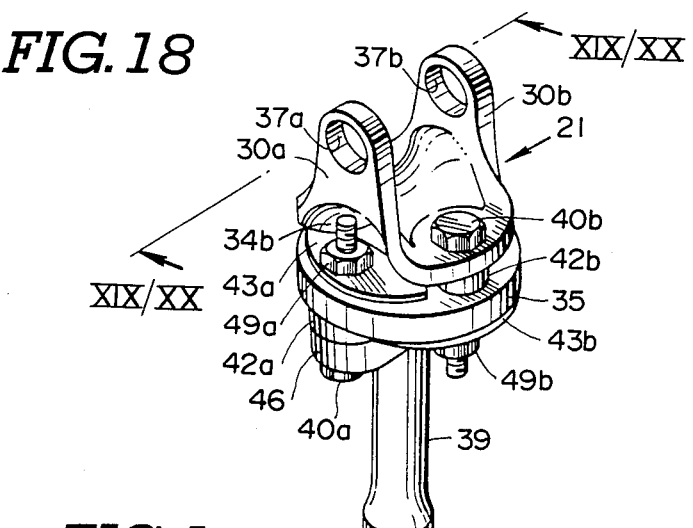
FIG. 18 is a drawing of the lower joint assembly shown in FIG. 17.
Figure 19:
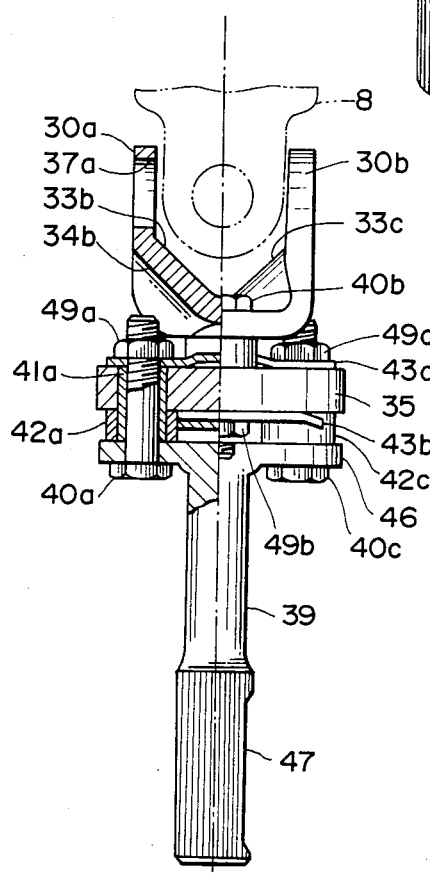
FIG. 19 is a cross-sectional view of the lower joint taken along the line XIX—XIX in FIG. 18.
Figure 20:
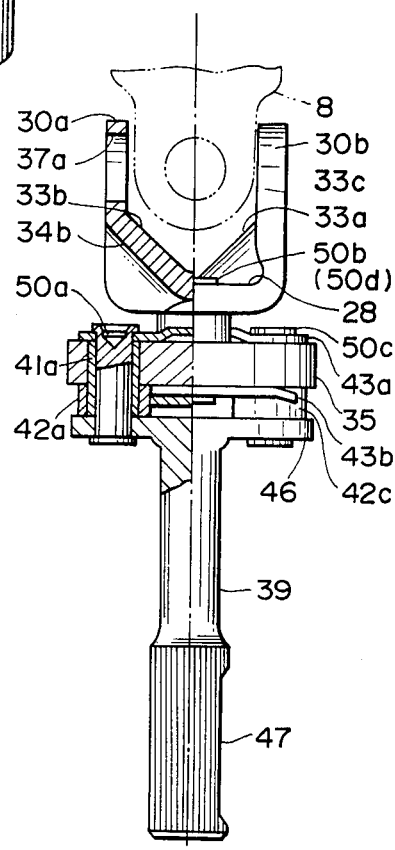
FIG. 20 is another cross-sectional view of the lower joint taken along the line XX—XX in FIG. 18 showing fastening means differing from that shown in FIG. 19.

FIG. 16 shows contiguous convexities 31a, 31b, 31c on the bottom surface and edges of the lower press 27a in a second yoke forming apparatus 27. Accordingly, recesses 32a, 32b, 32c opposing to the respective convexities 31a, 31b, 31c are formed on the upper punch 27b.

Therefore, during the process of pressing a preliminarily shaped sheet metal 22, central portions of the sheet metal 22 constituting the base portion 28 and semielliptical portions to be formed in the ear portions are embossed to form an integrated rib 33a, 33b, and 33c. Therefore, the rib 33a, 33b, 33c is contiguously extended from one ear portion 30a to the other ear portion 30b and base portion 23, as shown in FIGS. 13 to 15. During the embossing process, substantially hemispherical cone-shaped recesses 34b, 34c are interconnected via the central recess 34a and are correspondingly formed on the rear surface of the contiguous rib 33a, 33b, and 33c, as shown in FIGS. 13, 14, and 15. Therefore, in the same way as the first preferred embodiment, bolts 40a, 40c for fastening the rubber coupling 35 to the lower shaft 39 can well be nestled into the recesses 34b, 34c.

The contiguous rib 33a, 33b, and 33c increases the stiffness of the two ear portions 30a, 30b of the yoke 21 along their width W direction against deformation of the yoke and springback action of the press-formed ear portions.

Furthermore, since the threaded ends of bolts 40a, 40c projected from the nuts 49a, 49c can be nestled into the recesses 34b, 34c of the yoke 21, the bolts 40a, 40c can be disposed on the same circumference of the radius defined by the bolts 40b, 40d. That is to say, the bolts 40a, 40b, 40c, 40d and nuts 49a, 49b, 49c, 49d can be disposed within the periphery of the circular base or the size of the rubber coupling 35.

Since according to the present invention, the universal joint yoke is constructed as described above, the stiffness of the universal joint yoke can remarkably be increased while allowing its dimensions to be reduced. In addition, since the universal joint yoke and members on which the universal joint yoke is mounted can be minimized, the weight of the whole universal joint can be reduced and more free space can be obtained around the universal joint.

Furthermore, the rotation radius of the universal joint yoke can be reduced and joint angle of the yoke with respect to the opposite yoke can be increased.

In addition, the universal joint yoke according to the present invention is resistant to deformation under the large torque applied during the operation of steering wheel.

It will clearly be understood by those skilled in the art that the foregoing description is made in terms of preferred embodiments and various changes and modifications can be made without departing from the scope of the present invention which will be defined by the appended claims.

What is claimed is:

1. A universal joint, comprising:
    (a) a bent sheet metal blank, the blank before being bent having a generally cruciate form which has two semielliptical portions and a central circular portion,
    the bent sheet metal blank including;
    (b) a pair of ear portions which are respectively constituted by the semielliptical portions, are folded within the central circular portion and have two bores provided for mounting trunnions constituting a universal joint cross member;
    (c) a base portion defined by the central circular portion of the sheet metal blank and interconnecting the pair of ear portions, the base portion having two mutually spaced bores through which the bent sheet metal blank is fastened to means for elastically coupling the bent sheet metal blank to a shaft of a steering system by fastening means, the elastic coupling means having a substantially circular form which has generally the same diameter as that of the central circular portion; and
    (d) at least two rib portions projecting toward an inner space between the pair of ear portions and formed along a part of each major axis of the semielliptical portions including the base portion so as to extend over one of the pair of ear portions and the other of the pair of ear portions.

2. The universal joint according to claim 1, wherein distal ends of the pair of ear portions has the holes through which the two trunnions of the cross member connected to an opposite yoke is journalled and a peripheral part interconnected between said each ear portion and base portion has a concave curvature, whereby a joint angle of the opposite yoke with respect to the yoke is increased.

3. The universal joint according to claim 1, wherein recesses are formed correspondingly to the two inwardly projecting rib portions so as to extend toward the inside of said base portion and below a rear surface of the rib portions so that means for fastening the elastic coupling means to a lower shaft of a steering system is nestled into the recess.

4. The universal joint according to claim 3, wherein said fastening means is a pin arrangement.

5. The universal joint according to claim 3, wherein said fastening means is a bolt-and-nut arrangement.

6. The universal joint according to claim 5, wherein bolts are inserted through holes of a mounting flange of the lower shaft and of the elastic coupling means via collars and nuts are screwed into the threaded portions of the bolts via flat metal plates.

7. The universal joint according to claim 1, which further comprises another rib portion extended over the base portion so that the three inwardly projecting rib portions constitute a contiguous rib.

8. The universal joint according to claim 1, wherein bolts are inserted through the bores of the base portion to fasten the joint yoke to said elastic coupling means via collars and nuts are screwed into the threaded portions of the bolts via flat metal plates.

9. A universal joint, comprising:
(a) a bent sheet metal blank, the blank before being bent having a generally cruciate form which has two semielliptical portions and a central circular portion,
the bent sheet metal blank including;
(b) a pair of ear portions which are respectively constituted by the semielliptical portions and having two bores provided for mounting two trunnions constituting a universal joint member, said pair of ear portions are folded within the central circular portion;
(c) a base portion defined by the central circular portion of the sheet metal blank and interconnecting the pair of ear portions;
(d) a recess formed along a part of each major axis of two semielliptical portions including the base portion so as to provide a given space opposite to an inner space between the pair of ear portions;
(e) a rib portion for reinforcing each of the pair of ear portions provided along a surface of said recess facing the inner space between the pair of ear portions; and
(f) means for fastening elastic coupling means to a lower shaft of a steering linkage, the fastening means being nestled into said recess.

10. The universal joint according to claim 9, the recess extends substantially toward a center of the base portion.

11. The universal joint according to claim 9, the recess extends from one of the pair of ear portions to the other of the pair of ear portions via a center of said base portion.

* * * * *